United States Patent [19]

Morinaga et al.

[11] Patent Number: 5,624,996
[45] Date of Patent: Apr. 29, 1997

[54] DISPERSION OF FINE PARTICLES OF MODIFIED POLYETHYLENE AND PROCESS FOR PREPARATION THEREOF

[75] Inventors: Akio Morinaga; Takeo Kigami, both of Ohtake; Kunihiko Yorihiro, Yuu; Toshihiko Okada, Ohtake, all of Japan

[73] Assignee: Mitsui Petrochemical Industries, Ltd., Japan

[21] Appl. No.: 455,257

[22] Filed: May 31, 1995

Related U.S. Application Data

[63] Continuation of Ser. No. 103,559, Aug. 9, 1993, abandoned, which is a continuation-in-part of Ser. No. 939,430, Sep. 4, 1992, abandoned.

[30] Foreign Application Priority Data

Aug. 14, 1987 [JP] Japan .................. 62-201848

[51] Int. Cl.$^6$ ........................................ C08L 31/00
[52] U.S. Cl. ................. 524/556; 524/587; 523/336; 523/337; 523/339
[58] Field of Search ................... 524/556, 587; 523/337, 336, 339

[56] References Cited

U.S. PATENT DOCUMENTS 3,677,989  7/1972  Jenkinson ................. 524/556
3,919,149  11/1975  Cushman et al. ................. 524/556

FOREIGN PATENT DOCUMENTS

| 0216615 | 4/1987 | European Pat. Off. |
| 1050610 | 2/1952 | France . |
| WO86/06398 | 11/1986 | WIPO . |

OTHER PUBLICATIONS

Chemical Abstracts, vol. 97, 1982, p. 15, abstract No. 6979a, Columbus, OH, US; & JP-A-82 21 405 (Kao Soap Co., Ltd) Apr. 2, 1982, Abstract.

Chemical Abstracts, vol. 84, 1976, p. 55, abstract No. 151707w, Columbus, Ohio, US; & JP-A-76 08 354 (Asahi Chemical Industry Co., Ltd) Jan. 23, 1976, abstract.

*Primary Examiner*—Peter D. Mulcahy
*Attorney, Agent, or Firm*—Nixon & Vanderhye

[57] ABSTRACT

Disclosed is a dispersion of fine particles of modified polyethylene, which comprises a hydrocarbon organic solvent and fine particles of an ethylene polymer or ethylene polymer composition dispersed in the solvent, wherein the ethylene polymer or ethylene polymer composition has an acid value of 0.3 to 75 mg-KOH/g as a whole and a crystallinity of at least 45% as determined by the X-ray diffractometry and has an average dispersed particle size of 0.3 to 20 μm and a concentration of 15 to 60% by weight.

21 Claims, No Drawings

DISPERSION OF FINE PARTICLES OF MODIFIED POLYETHYLENE AND PROCESS FOR PREPARATION THEREOF

This is a continuation of application Ser. No. 08/103,559, filed Aug. 9, 1993 now abandoned, which is a continuation-in-part of 07/939,430 filed Sep. 4, 1992, now abandoned.

BACKGROUND OF THE INVENTION

(1) Field of the Invention

The present invention relates to a dispersion of fine particles of modified polyethylene in an organic liquid and a process for the preparation thereof. More particularly, the present invention relates to a dispersion of fine particles of modified polyethylene, which is valuable as an additive of an oily printing ink, and a process for the preparation thereof.

(2) Description of the Prior Art

For improving the tack and abrasion resistance in an oily printing ink, especially a planographic or offset printing ink, polyethylene wax or the like is often incorporated in the printing ink. It is indispensable that the wax used for this purpose should be homogeneously incorporated in the ink.

As means for incorporating the wax in the ink, there are now adopted a method in which a pulverized wax is used, a method in which an unpulverized solid wax is kneaded, and a method in which a wax crystallized in an oil is used.

Of these printing ink waxes, the pulverized wax or unpulverized wax is defective in that since the wax particle size distribution in the ink is broad, if the wax is added in an amount sufficient to impart an abrasion resistance to the ink, the gloss of the printed image tends to decrease. The crystallized wax is defective in that since the wax is solidified if the wax concentration is increased, it is difficult to obtain an ink having a high wax concentration. As a compounding agent for a polyethylene wax for use in an oily printing ink, an aqueous emulsified dispersion or an aqueous suspended dispersion is prepared. Water is separated from it, and the reminder is used as a polyethylene wax compounding agent. Or an organic solvent is added to these solid particles, and the resulting product may be used as a compounding agent. To use these compounding agents for an oily printing ink, the water content of these compounding agents must be made as small as possible.

When products having a large water content are used as the compounding agents, troubles such as phase separation are liable to occur at the time of compounding, and these troubles impede the operation of manufacturing the oily ink production. At the same time, the operability will be markedly lowered. In order to remove water sufficiently from the aqueous emulfied or suspended dispersion, it is possible to perform such means as distillation under reduced pressure and dehydration by molecular sieves. These means cost very high or may involve inconveniences such as poor yields.

SUMMARY OF THE INVENTION

It is an object of this invention therefore to provide a dispersion in which a specified ethylene polymer or ethylene polymer composition as fine particles is dispersed in a hydrocarbon solvent in a high concentration and the amount of water copresent in the hydrocarbon solvent is adjusted below a small specified amount, and a method of producing the dispersion.

Another object of the present invention is to provide an organic solvent dispersion of fine particles of modified polyethylene which can exert effects of imparting a good tack, improving the abrasion resistance and preventing the transfer only by addition to an oily ink and in which the amount incorporated can be reduced as compared with the amounts incorporated of the conventional dispersions because the dispersed particle size is very fine and the particle size distribution is very sharp, and a process for the preparation thereof.

Still another object of the present invention is to provide a process in which the above-mentioned dispersion can be obtained at a high efficiency without using any troublesome operation or any particular apparatus.

In accordance with one aspect of the present invention, there is provided a dispersion of fine particles of modified polyethylene, which comprises (1) 80 to 100 parts by weight of a hydrocarbon organic solvent and fine particles of an ethylene polymer or ethylene polymer composition, and (2) 0 to 25 parts by weight of water, said fine particles being dispersed in the solvent and the water medium, wherein the ethylene polymer or ethylene polymer composition is an organic acid modified polymer or polymer composition having an acid value of 0.3 to 75 mg-KOH/g as a whole and having a crystallinity of at least 45% as determined by X-ray diffractometry, and the particles have an average dispersed particle size of 0.3 to 20 μm, and the weight ratio of the particles to the hydrocarbon organic solvent is 100/60 to 100/600.

In accordance with another aspect of the present invention, there is provided a process for the preparation of a dispersion of fine particles of modified polyethylene, which comprises adding an acid to an aqueous dispersion containing in the form of fine particles having an average dispersed particle size of 0.3 to 20 μm an ethylene polymer or ethylene polymer composition having an acid value of 0.3 to 75 mg-KOH/g as a whole and a crystallinity of at least 45% as determined by the X-ray diffractometry, in which at least a part of the carboxyl group corresponding to said acid value is neutralized with a basic substance, to agglomerate the fine particles, adding a hydrocarbon organic solvent to the agglomerate to transfer the fine particles into the solvent phase, and separating and removing the aqueous phase.

DETAILED DESCRIPTION OF THE PREFERRED EMBODIMENTS

The present invention utilizes the following phenomena. If an ethylene polymer or ethylene polymer composition having an acid value of 0.3 to 75 mg-KOH/g is neutralized with a basic substance, a self-emulsifiable or self-dispersible aqueous dispersion having an average dispersed particle size of 0.3 to 20 μm and a sharp particle distribution is obtained. If an acid is added to this aqueous dispersion, fine particles of the ethylene polymer or ethylene polymer composition are agglomerated and separated. If this agglomerate is mixed with a hydrocarbon organic solvent, the ethylene polymer or ethylene polymer composition is dispersed and transferred in the form of the original fine particles into the organic solvent phase and simultaneously, the aqueous phase is separated.

The ethylene polymer or ethylene polymer composition used in the present invention (often referred to as "modified polyethylene" hereinafter) has a carboxyl group in an amount corresponding to the above-mentioned acid value. If this carboxyl-modified polyethylene is dispersed in the molten state in water containing a basic substance, there is formed a dispersion of fine particles off the modified polyethylene in which highly ionized carboxyl anions are oriented to the outer surface. The fine particles are self-emulsifiable or self-dispersible because of the presence of the above-mentioned anionic active group. If an acid is added to this aqueous dispersion, the basic substance as the counter ion of the carboxyl anion is neutralized and the carboxyl group is converted to a hydrogen type having a low ionization degree. Accordingly, the self-emulsifiability or self-dispersibility in water of the modified polyethylene fine particles is drastically reduced and the fine particles are agglomerated and separated. If a hydrocarbon solvent is added to the agglomerate, by the inherent oleophilic property of the modified polyethylene, the modified polyethylene is dispersed in the form of fine particles in the solvent.

The modified polyethylene used in the present invention have an acid value of 0.3 to 75 mg-KOH/g, especially 1.5 to 30 mg-KOH/g in order to control the dispersed particle size within the above-mentioned fine size range. The modified polyethylene have a crystallinity of at least 45%, especially at least 60%, as determined by the X-ray diffractometry. If the crystallinity is too low, dissolution of fine particles of the modified polyethylene in a hydrocarbon solvent is observed.

The dispersion of fine particles of the modified polyethylene according to the present invention has an average dispersed particle size (median diameter) of 0.3 to 20 μm, especially 2 to 10 μm, and the particle size is very fine. Furthermore, the concentration is 15 to 60% by weight, especially 30 to 50% by weight. Thus, the dispersion is further characterized by such a fine particle size and such a high concentration. Furthermore, the dispersion of fine particles is characterized in that the distribution of the dispersed particle size is very sharp, and the standard deviation value (δ) is smaller than 20 μm, especially smaller than 5 μm. Although the dispersion of fine particles of the modified polyethylene has a fine particle size and a high concentration, the viscosity is relatively low, and the viscosity is 1 to 10,000 cP, especially 20 to 1,000 cP, as measured by a Brookfield type viscometer at a concentration of 40% by weight and a temperature of 25° C.

The modified polyethylene used in the present invention will now be described in detail.

In the present invention, (1) an ethylene polymer modified to have a carboxyl group and (2) a composition comprising an ethylene polymer modified to have a carboxyl group and a carboxyl group-free ethylene polymer are defined as the modified polyethylene in the present invention.

Introduction of a carboxyl group in an ethylene polymer can be accomplished by including in the main chain or side chain of the polymer an ethylenically unsaturated carboxylic acid or an ethylenically unsaturated monomer capable of producing an ionized carboxyl group by reaction with a base by such means as graft copolymerization, block copolymerization or random copolymerization. As preferred monomers, there can be mentioned ethylenically unsaturated carboxylic acids and anhydrides thereof such as acrylic acid, methacrylic acid, maleic acid, fumaric acid, tetrahydrophthalic acid, itaconic acid, citraconic acid, crotonic acid, isocrotonic acid, Nadic® acid (endocis-bicyclo[2,2,1]hepto-5-ene-dicarboxylic acid), maleic anhydride and citraconic anhydride, and as the unsaturated carboxylic acid ester, there can be mentioned methyl, ethyl and propyl monoesters and diesters of the above-mentioned carboxylic acids.

The carboxyl-modified ethylene monomer contains the above-mentioned monomer component in an amount corresponding to the above-mentioned acid value, and the other component is ethylene or a combination of ethylene with other α-olefin such as propylene, 1-butene, 3-methyl-1-butene, 4-methyl-1-pentene, 3-methyl-1-pentene, 1-heptene, 1-hexene, 1-decene or 1-dodecene. It is preferred that the inherent viscosity (η) (as measured in decalin as the solvent at 135° C.) of this copolymer be lower than 5 dl/g, especially 0.04 to 1 dl/g.

The preferred carboxyl-modified polyethylene is a polyethylene wax grafted with acrylic acid, methacrylic acid or maleic anhydride, and this grafted polyethylene wax having an inherent viscosity (η) of 0.04 to 0.5 dl/g is especially preferred.

In accordance with a preferred embodiment of the present invention, a composition of a carboxyl-modified ethylene polymer as mentioned above and an unmodified ethylene polymer is used. As the unmodified ethylene polymer, there can be mentioned low-density polyethylene, medium-density polyethylene, high-density polyethylene, linear low-density polyethylene, an ethylene/propylene copolymer, an ethylene/butene-1 copolymer, an ethylene/propylene/butene-1 terpolymer, an ethylene/pentene-1 copolymer, an ethylene/4-methylpentene-1 copolymer, an ethylene/acrylic acid ester copolymer, an ethylene/methacrylic acid copolymer and an ethylene/vinyl acetate copolymer. It is indispensable that the ethylene polymer used should have the above-mentioned crystallinity. For this purpose, it is preferred that the amount of the comonomer to be copolymerized with ethylene be smaller than 15% by weight, especially smaller than 10% by weight, though the preferred amount differs to some extent according to the kind of the comonomer or the copolymerization process.

It is preferred that the inherent viscosity (η) of the unmodified copolymer be lower than 5 dl/g, especially 0.04 to 1 dl/g, and as the unmodified ethylene polymer suitable for a printing ink, there can be mentioned a polyethylene wax or ethylene/propylene copolymer wax having an inherent viscosity (η) of 0.08 to 0.5 dl/g and a density of 0.91 to 0.98 g/cc.

The carboxyl-modified ethylene polymer and the unmodified ethylene polymer can be combined so that the acid value and crystallinity of the composition as a whole are within the above-mentioned ranges. The mixing ratio of both the polymers can be changed within a broad range, but it is preferred that the carboxyl-modified polymer is mixed with the unmodified polymer at a weight ratio of from 1/99 to 50/50, especially from 3/97 to 0/80.

The preparation of the aqueous dispersion used in the present invention will now be described.

The aqueous dispersion used in the present invention is prepared by neutralizing the carboxyl-modified polyethylene in the molten state with an aqueous medium containing a basic substance and simultaneously, forming an oil-in-water dispersion by the phase invention. By neutralizing at least a part of the carboxyl group of the carboxyl-modified polyethylene in the molten state, the carboxyl group is highly ionized and the aqueous phase is drawn into the molten resin with this ionization. Simultaneously, the carboxyl group in the state of an anion is oriented in the interface between the molten resin and the aqueous phase and an anionic emulsified dispersion is formed. Because of the presence off the anionic carboxyl group, the particles are self-emulsifiable and self-dispersible, and the particles are so fine that the average dispersed particle size is 0.03 to 20 μm, especially 2 to 10 μm. Moreover, the particle size distribution is so sharp that the standard deviation . value of the particle size is smaller than 20 μm, especially smaller than 5 μm.

As the basic substance used for the neutralization, there can be mentioned substances acting as a base in water, such as alkali metals, alkaline earth metals, ammonia and amines, and compounds acting as a base in water, such as oxides, hydroxides, weak acid salts and hydrides of alkali metals, oxides, hydroxides, weak acid salts and hydrides of alkaline earth metals and alkoxides of these metals. Specific examples are as follows.

(1) Alkali metals such as sodium and potassium, and alkaline earth metals such as calcium, strontium and barium.

(2) Amines such as inorganic amines, e.g., hydroxylamine and hydrazine, and methylamine, ethylamine, ethanolamine and cyclohexylamine.

(3) Oxides, hydroxides and hydrides of alkali metals and alkaline earth metals such as sodium oxide, sodium peroxide, potassium oxide, potassium peroxide, calcium oxide, strontium oxide, barium oxide, sodium hydroxide, potassium hydroxide, calcium hydroxide, strontium hydroxide, barium hydroxide, sodium hydride, potassium hydride and calcium hydride.

(4) Weak acid salts of alkali metals and alkaline earth metals such as sodium carbonate, potassium carbonate, sodium hydrogencarbonate, potassium hydrogencarbonate, calcium hydrogencarbonate, sodium acetate, potassium acetate and calcium acetate.

(5) Ammonia and amine compounds such as ammonium hydroxide, quaternary ammonium compounds, e.g., tetramethylammonium hydroxide, and hydrazine hydrate.

The amount of the basic substance used for the neutralization is an amount sufficient to neutralize at least a part, especially at least 20%, of the carboxyl group. It is preferred that the amount of water mixed with the modified polyethylene be 100 to 9900% by weight, especially 400 to 900% by weight, based on the modified polyethylene. The modified polyethylene is mixed with water at a temperature higher than the melting temperature of the modified polyethylene, preferably 130° to 200° C. It is preferred that mixing of the modified polyethylene with the aqueous solution of the basic substance be carried out with stirring by a high shearing force. For this purpose, a kneader, a compression type homomixer or a uniaxial or polyaxial extruder type kneading machine can be used.

The preparation of the intended solvent type dispersion will now be described in detail.

According to the present invention, an acid is added to the above-mentioned aqueous dispersion to agglomerate the dispersed fine particles of the modified polyethylene. As the acid used for neutralizing the basic substance, there can be mentioned acids forming water-soluble salts by reaction with the basic substance, for example, inorganic acid such as sulfuric acid, hydrochloric acid, nitric acid and phosphoric acid, and organic acids such as various sulfonic acids. The acid is preferably added in such an amount that the pH value of the aqueous phase is smaller than 6, especially 2 to 4.

According to a preferred embodiment of the present invention, a surface active agent is added to the aqueous dispersion prior to the addition of the acid, whereby re-dispersion and transfer of the agglomerated fine particles of the modified polyethylene into the oil phase can be easily accomplished. A nonionic surface active agent having a low HLB value, preferably an HLB value lower than 12, more preferably lower than 10, especially preferably lower than 8, is used as the surface active agent. In general, polyoxyethylene alkyl ethers, polyoxyethylene alkylphenyl ethers, polyoxyethylene fatty acid esters, polyoxyethylene fatty acid amide ethers, polyhydric alcohol fatty acid esters, polyoxyethylene polyhydric alcohol fatty acid esters, fatty acid sucrose esters, alkylolamides and polyoxyalkylene block copolymers, which have an HLB value within the above-mentioned range, are used. In these nonionic surface active agents, the HLB value is generally reduced with decrease of the content of the polyoxyethylene units. Accordingly, a nonionic surface active agent having a desired HLB value can be obtained by adjusting the mole number of the added ethylene oxide. It is preferred that the nonionic surface active agent be added in an amount of 0.1 to 10% by weight, especially 0.3 to 2.0% by weight, based on the modified polyethylene.

Room temperature is sufficient as the temperature of the aqueous dispersion at the neutralizing step, but it is permissible that the aqueous dispersion may be heated at up to about 60° C. according to need. In view of the operation easiness, it is preferred that the concentration of the aqueous dispersion be 5 to 50% by weight.

By mixing the formed agglomerate of fine particles of the modified polyethylene with a hydrocarbon organic solvent and stirring the mixture, the fine particles are transferred into the oil phase from the aqueous phase and dispersed in the oil phase.

This hydrocarbon organic type dispersion contains water accompanying the aggregate of the above modified polyethylene fine particles. In order to avoid troubles such as phase division by the water when this dispersion is mixed with the oily ink in the present invention, the water content contained by the dispersion is adjusted to 25 parts by weight or less, preferably 20 parts by weight or less, more preferably 10 parts by weight or less, per 80 to 100 parts by weight of the modified polyethylene and the hydrocarbon organic solvent combined.

The adjustment of the water content in the dispersion is achieved by properly controlling the amount of the hydrocarbon organic solvent to be added, and the separation conditions of the aqueous layer after the addition of the solvent, for example, the temperature and the time during which the dispersion is left to stand.

As the hydrocarbon solvent (medium), there can be optionally used hydrocarbon solvents such as aliphatic hydrocarbons, alicyclic hydrocarbons, aromatic hydrocarbons and mixtures thereof. Among them, there are preferably used n-paraffin type hydrocarbon solvents such as n-hexane, n-octane, n-decane and n-dodecane, and isoparaffin type hydrocarbon solvents such as 2-ethylhexane and Isopar. The amount of the hydrocarbon solvent to be added is 60 to 600 parts by weight of the hydrocarbon solvent per 100 parts by weight of the modified polyethylene. If the amount added is less than 60 parts by weight, the content of water is the dispersion as the product becomes too large if the amount of water contained in the agglomerate is too large. Accordingly, when the dispersion is mixed with the oily ink, troubles such as phase dispersion are liable to occur unpreferably. On the other hand, to obtain a dispersion of a high concentration in a good yield, the added amount of the solvent added should be 600 parts by weight or less. The preferred range is 60 to 150 parts by weight, especially preferably 80 to 120 parts by weight, per 100 parts of the modified polyethylene.

The added hydrocarbon solvent and the modified polyethylene aggregate may sufficiently be mixed and stirred usually at room temperature and the separation of the aqueous layer may be carried out at room temperature. As required, it may be carried out at a temperature of 0° to about 60° C. In general, transfer of the modified polyethylene into the oil phase is completed within 3 to 300 minutes. If the above-mentioned surface active agent is used in combination, the transfer is promptly completed and the dispersibility of particles in the oil phase is improved.

The aqueous layer separated from the mixture is removed, and if necessary, the oil phase is washed with water. Thus, a dispersion of fine particles of the modified polyethylene in the hydrocarbon solvent can be obtained.

In order to improve the storage stability of the dispersion, an oil-soluble high-molecular-weight polymer or a modified clay such as organic bentonite can be added as a thickening agent.

The preparation of an oily ink by using the dispersion of fine particles of the modified polyethylene will now be described.

When an oily ink is prepared by using the dispersion of fine particles of the modified polyethylene according to the present invention, in the known process comprising premixing a pigment with a varnish, grinding the pigment to a form close to the primary particle by a three-roll mill or the like and adding an assistant to the mixture to form an oily ink, the dispersion of fine particles of the modified polyethylene is added a the final preparing step. The dispersion is used in an amount of 0.3 to 5% by weight as the solid based on the sum of the pigment and varnish.

The dispersion of the present invention is advantageous in that an excellent oily ink can be obtained only by adding the dispersion at the preparing step without passing the dispersion through the grinding step. Conventional waxes are added at the grinding step, and since large quantities are treated at the grinding step, final products having a substantially equal standard are obtained in large quantities. In contrast, since the dispersion of the present invention is added at the final preparing step, the dispersion of the present invention is advantageously applied to the production of small amount of a variety of final products differing in the standard.

According to the present invention, there can be obtained a hydrocarbon solvent dispersion containing carboxyl-modified polyethylene in the form of fine particles at a high concentration. Only by adding this dispersion to an oily ink for planographic printing or offset printing, there can be attained effects of improving the abrasion resistance of the ink and preventing the transfer of the ink. Moreover, since the particle size is fine and uniform, these excellent effects can be attained by incorporating the dispersion in a small amount (0.3 to 5% by weight as the solid).

The present invention will now be described in detail with reference to the following examples that by no means limit the scope of the invention

REFERENCE EXAMPLE 1

A maleic anhydride ethylene/propylene copolymer wax having an inherent viscosity ($\eta$) of 0.15 dl/g, an acid value of 3.0 mg-KOH/g, a propylene content of 7% by weight and a crystallinity of 65% was used as the modified polyethylene.

A pressure-resistant homomixer having an inner capacity of 4 l was charged with 1500 cc of water and 0.96 g of potassium hydroxide (0.8 equivalent to the carboxyl group in the modified polyethylene), and the mixture was heated at 140° C. and 400 g of the modified polyethylene molten at 140° C. was supplied to the mixture with stirring over a period of 1 hour by using a gear pump. Then, the mixture was stirred for 30 minutes and cooled to room temperature to obtain an aqueous dispersion of the modified polyethylene. The average particle size was 4 μm.

REFERENTIAL EXAMPLE 2

An aqueous dispersion was prepared in the same manner as described in Referential Example 1 except that a maleic anhydride-modified low-pressure method polyethylene wax having an inherent viscosity ($\eta$) of 0.22 dl/g,. an acid value of 3.4 mg-KOH/g and a crystallinity of 80% was used as the modified polyethylene. The average particle size was 3.5 μm.

REFERENTIAL EXAMPLE 3

An aqueous dispersion was prepared in the same manner as described in Referential Example 1 except that an acrylic acid-grafted high-pressure method low-density polyethylene having an inherent viscosity ($\eta$) of 0.7 dl/g, an acid value of 20 mg-KOH/g and a crystallinity of 57% was used as the modified polyethylene and the heating temperature was changed to 200° C. The average particle size was 10 μm.

REFERENTIAL EXAMPLE 4

An aqueous dispersion was prepared in the same manner as described in Referential Example 1 except that a maleic anhydride-modified high-pressure method low-density polyethylene wax having an inherent viscosity ($\eta$) of 0.8 dl/g, an acid value of 3.0 mg-KOH/g and a crystallinity of 58% was used as the modified polyethylene and the heating temperature was changed to 200° C. The average particle size was 10 μm.

EXAMPLE 1

The aqueous dispersion of the modified polyethylene obtained in Referential Example 1 was diluted with distilled water so that the solid concentration was 10% by weight, and the dilution was used as the starting material. A beaker having a capacity of 500 cc, in which stirring vanes were placed, was charged with 200 g of the starting material. Incidentally, all of "parts" given hereinafter are parts by weight based on the amount of the solid in the starting material, which is regarded as 100 parts by weight. To the starting material was added 0.5 part of a surface active agent (polyoxyethylene nonylphenyl ether having an HLB value of 7.8), and the mixture was stirred at 500 rpm for 10 minutes. Then, 40 parts of 0.1N sulfuric acid was added to the mixture, and the mixture wets stirred at 500 rpm for 10 minutes. Then, 120 parts of Mitsui hexane was added as the oil to the mixture, and the mixture was stirred at 500 rpm for 30 minutes. After stirring, 500 cc of the liquid contained in the beaker was transferred to a separating funnel, shaken for 1 minute and allowed to stand still, whereby the liquid was separated into a transparent aqueous layer and an opaque oil layer. The aqueous layer was removed while only the oil layer was left. For washing, 120 parts of distilled water was added to the oil layer, and the mixture was shaken for 10 minutes and allowed to stand still, whereby the mixture was separated into a transparent aqueous layer and an opaque oil layer. The aqueous layer was removed while only the oily layer was recovered (as the dispersion product). when the oil layer was analyzed, it was found that the water content was 3% by weight and the solid content was 41% by weight. The average particle size was 4 μm.

EXAMPLE 2

The procedures of Example 1 were repeated in the same manner except that n-decane was used instead of Mitsui hexane.

When the recovered oil layer was analyzed, it was found that the water content was 3.4% by weight and the solid content was 42% by weight. The average particle size was 4 μm.

EXAMPLE 3

The procedures of Example 2 were repeated in the same manner except that the amount of the added oil was changed to 80 parts from 120 parts.

When the recovered oil layer was analyzed, it was found that the water content was 12% by weight and the solid content was 45% by weight. The average particle size was 4 μm.

EXAMPLE 4

The procedures of Example 2 were repeated in the same manner except that 0.1N HCl was added as the acid instead of 0.1N $H_2SO_4$.

When the recovered oil layer was analyzed, it was found that the water content was 5% by weight and the solid content was 40% by weight. The average particle size was 4 μm.

EXAMPLE 5

The procedures of Example 1 were repeated in the same manner except that the surface active agent was not added to the starting material.

When the recovered oil layer was analyzed, it was found that the water content was 20% by weight and the solid consent was 35% by weight. The average particle size was 4 μm.

EXAMPLE 6

The procedures of Example 2 were repeated in the same manner except that sorbitol trioleate (HLB=1.8) was used as the surface active agent instead of the polyoxyethylene nonylphenyl ether.

When the recovered oil layer was analyzed, it was found that the water content was 15% by weight and the solid content was 35% by weight. The average particle sized was 4 μm.

COMPARATIVE EXAMPLE 1

When it was intended to repeat the procedures of Example 2 in the same manner except that the amount of the added oil was changed to 40 parts from 120 parts, at the first standing step the oil layer was converted to drops and the separation of the liquid was impossible.

EXAMPLE 7

The procedures of Example 2 were repeated in the same manner except that the aqueous dispersion obtained in Referential Example 2 was used as the aqueous dispersion of the modified polyethylene instead of the aqueous dispersion obtained in Referential Example 1.

When the recovered oil layer was analyzed, it was found that the water content was 3.6% by weight and the solid content was 41% by weight. The average particle size was 3.5 μm.

EXAMPLE 8

The procedures of Example 7 were repeated in the same manner except that the amount of the added oil was changed to 80 parts from 120 parts and the solid concentration in the starting material was changed to 20% by weight.

When the recovered oil layer was analyzed, it was found that the water content was 10% by weight and the solid content was 45% by weight. The average particle size was 3.5 μm.

EXAMPLE 9

The procedures of Example 7 were repeated in the same manner except that 100 parts of toluene was added as the oil instead of 120 parts of n-decane and washing with distilled water was not carried out.

When the recovered oil layer was analyzed, it was found that the water content was 20% by weight and the solid content was 35% by weight. The average particle size was 3.5 μm.

EXAMPLE 10

The procedures of Example 2 were repeated in the same manner except that the aqueous dispersion obtained in Referential Example 3 was used as the aqueous dispersion of the modified polyethylene instead of the aqueous dispersion obtained in Referential Example 1.

When the recovered oil layer was analyzed, it was found that the water content was 20% by weight and the solid content was 34% by weight. The average particle size was 10 μm.

EXAMPLE 11

The procedures of Example 2 were repeated in the same manner except that the aqueous dispersion obtained in Referential Example 4 was sued as the aqueous dispersion of the modified polyethylene instead of the aqueous dispersion obtained in Referential Example 1.

When the recovered oil layer was analyzed, it was found that: the water content was 10% by weight and the solid content was 37% by weight. The average particle size was 10 μm.

The foregoing examples are summarized in Table 1.

TABLE 1

|  | Example 1 | Example 3 | Example 2 |
| --- | --- | --- | --- |
| particle-constituting polymer | PE-WAX (HW125P) ($C_3^{11}$ content = 7 wt. %) | PE-WAX (HW125P) ($C_3^{11}$ content = 7 wt. %) | PE-WAX (HW125P) ($C_3^{11}$ content = 7 wt. %) |
| average particle size (μm) | 4 | 4 | 4 |
| solid content (%) | 10 | 10 | 10 |
| surface active agent | polyethylene nonylphenyl ether, HLB = 7.8 | polyethylene nonylphenyl ether, HLB = 7.8 | polyethylene nonylphenyl ether, HLB = 7.2 |
| amount (parts) of surface active agent | 0.5 | 0.5 | 0.5 |
| coagulant | 0.1 N $H_2SO_4$ | 0.1 N $H_2SO_4$ | 0.1 N $H_2SO_4$ |
| amount (parts) of coagulant | 40 | 40 | 40 |

TABLE 1-continued

| | | | |
|---|---|---|---|
| oil | Mitsui hexane | n-decane | n-decane |
| amount (parts) of oil | 120 | 80 | 120 |
| phase separation (first) | good | good | good |
| standing time (min) | 10 | 10 | 10 |
| amount (parts) of washing water | 120 | 120 | 120 |
| phase separation (second) | good | good | good |
| water content (%) in product | 3.1 | 12 | 3.4 |
| solid content (%) in product | 41 | 45 | 42 |
| average particle size (μm) of product | 4 | 4 | 4 |

| | Example 7 | Example 11 | Example 4 |
|---|---|---|---|
| particle-constituting polymer | PE-WAX (HW100P) (PE Homo) | PE (Mirason FL-60) | PE-WAX (HW125P) ($C_3^{11}$ content = 7 wt. %) |
| average particle size (μm) | 3.5 | 10 | 4 |
| solid content (%) | 10 | 10 | 10 |
| surface active agent | polyoxyethylene nonylphenyl ether, HLB = 7.8 | polyoxyethylene nonylphenyl ether, HLB = 7.8 | polyoxyethylene nonylphenyl ether, HLB = 7.8 |
| amount (parts) of surface active agent | 0.5 | 0.5 | 0.5 |
| coagulant | 0.1 N $H_2SO_4$ | 0.1 N $H_2SO_4$ | 0.1 N HCl |
| amount (parts) of coagulant | 40 | 40 | 40 |
| oil | n-decane | n-decane | n-decane |
| amount (parts) of oil | 120 | 120 | 120 |
| phase separation (first) | good | good | good |
| standing time (min) | 10 | 10 | 10 |
| amount (parts) of washing water | 120 | 120 | 120 |
| phase separation (second) | good | good | good |
| water content (%) in product | 3.6 | 10 | 5 |
| solid content (%) in product | 41 | 37 | 40 |
| average particle size (μm) of product | 3.5 | 10 | 4 |

| | Example 8 | Example 9 | Example 5 |
|---|---|---|---|
| particle-constituting polymer | PE-WAX (HW100P) (PE Homo) | PE-WAX (HW100P) (PE Homo) | PE-WAX (HW125P) ($C_3^{11}$ content = 7 wt. %) |
| average particle size (μm) | 3.5 | 3.5 | 4.0 |
| solid content (%) | 20 | 10 | 10 |
| surface active agent | polyoxyethylene nonylphenyl ether, HLB = 7.8 | polyoxyethylene nonylphenyl ether, HLB = 7.8 | not added |
| amount (parts) of surface active agent | 0.5 | 0.5 | 0 |
| coagulant | 0.1 N $H_2SO_4$ | 0.1 N $H_2SO_4$ | 0.1 N $H_2SO_4$ |
| amount (parts) of coagulant | 40 | 40 | 40 |
| oil | n-decane | toluene | Mitsui hexane |
| amount (parts) of oil | 80 | 100 | 120 |
| phase separation (first) | good | good | good |
| standing time (min) | 10 | 10 | 10 |
| amount (parts) of washing water | 300 | not washed | 100 |
| phase separation (second) | good | good | good |
| water content (%) in product | 10 | 20 | 20 |
| solid content (%) in product | 45 | 35 | 35 |
| average particle size (μm) of product | 3.5 | 3.5 | 4 |

| | Example 6 | Comparative Example 1 | Example 10 |
|---|---|---|---|
| particle-constituting polymer | PE-WAX (HW125P) ($C_3^{11}$ content = 7 wt. %) | PE-WAX (HW125P) ($C_3^{11}$ content = 7 wt. %) | PE-(Mirason FL-60) (acrylic acid-modified wax) |
| average particle size (μm) | 4.0 | 4.0 | 10.5 |
| solid content (%) | 10 | 10 | 10 |
| surface active agent | solbitol oleate (HLB = 1.8) | polyoxyethylene nonylphenyl ether, HLB = 7.8 | polyoxyethylene nonylphenyl ether, HLB = 7.8 |
| amount (parts) or surface active agent | 0.5 | 0.5 | 0.5 |
| coagulant | 0.1 N $H_2SO_4$ | 0.1 N $H_2SO_4$ | 0.1 N $H_2SO_4$ |
| amount (parts) of coagulant | 40 | 40 | 40 |
| oil | n-decane | n-decane | n-decane |
| amount (parts) of oil | 120 | 10 | 120 |
| phase separation (first) | good | oil phase was not formed into continuous layer but formed into drops | good |
| standing time (min) | 10 | | 10 |

TABLE 1-continued

| | | |
|---|---|---|
| amount (parts) of washing water | 100 | 100 |
| phase separation (second) | good | good |
| water content (%) in product | 15 | 20 |
| solid content (%) in product | 35 | 34 |
| average particle size (μm) or product | 4 | 10 |

We claim:

1. A dispersion of fine particles of modified polyethylene, which comprises:

(1) 80 to 100 parts by weight of a hydrocarbon organic solvent and fine particles of an ethylene polymer or ethylene polymer composition, and (2) 0 to 25 parts by weight, based on the weight of the solvent and the polymer or polymer composition, of water, said fine particles being dispersed in the solvent and the water medium, wherein the ethylene polymer or ethylene polymer composition is an organic acid graft-modified polymer or polymer composition having an acid value of 0.3 to 75 mg-KOH/g as a whole and having a crystallinity of at least 45% as determined by X-ray diffractometry, the particles having an average dispersed particle size of 0.3 to 20 μm, and the weight ratio of the particles to the hydrocarbon organic solvent is 100/60 to 100/600.

2. A dispersion as set forth in claim 1, wherein the ethylene polymer or ethylene polymer composition has an acid value of 1.5 to 30 mg-KOH/g as a whole and a crystallinity of at least 60%.

3. A dispersion as set forth in claim 1, wherein the dispersed particle size is 2 to 10 μm and the weight ratio of the particles to the hydrocarbon organic solvent is from 100/60 to 100/150.

4. A dispersion as set forth in claim 1, wherein the standard deviation value (δ) of the dispersed particle size is smaller than 5 μm.

5. A dispersion as set forth in claim 1, wherein the viscosity is 1 to 10,000 cP as determined by using a Brookfield type viscometer at a concentration of 40% by weight and a temperature of 25° C.

6. A dispersion as set forth in claim 5, wherein the viscosity is 20 to 1,000 cP.

7. A dispersion as set forth in claim 1, wherein the ethylene polymer is a carboxyl group-modified ethylene polymer in which an ethylenically unsaturated carboxylic acid or an anhydride thereof is included in the main chain or side chain of the polymer by graft copolymerization, block copolymerization or random copolymerization.

8. A dispersion as set forth in claim 1, wherein the ethylene polymer has an inherent viscosity (η) of 0.04 to 1 dl/g as measured in decalin as the solvent at 135° C.

9. A dispersion as set forth in claim 1, wherein the ethylene polymer is a polyethylene wax grafted with acrylic acid, methacrylic acid or maleic anhydride, which has an inherent viscosity (η) of 0.04 to 0.5 dl/g.

10. A dispersion as set forth in claim 1, wherein the ethylene polymer composition is a composition comprising (i) a carboxyl group-modified ethylene polymer in which an ethylenically unsaturated carboxylic acid or anhydride thereof is included in the main chain or side chain of the polymer by graft copolymerization, block copolymerization or random polymerization and (ii) an unmodified ethylene polymer at a weight ratio of from 1/99 to 50/50.

11. A dispersion as set forth in claim 10, wherein the ethylene polymer composition comprises the polymers (i) and (ii) at a weight ratio of from 3/97 to 20/80.

12. A dispersion as set forth in claim 10, wherein the ethylene polymer composition is a composition comprising (i) a polyethylene wax grafted with acrylic acid, methacrylic acid or maleic anhydride, which has an inherent viscosity (η) of 0.04 to 0.5 dl/g, and (ii) a polyethylene wax or ethylene/propylene copolymer wax having an inherent viscosity (η) of 0.08 to 0.5 dl/g and a density of 0.91 to 0.98 g/cc at a weight ratio of from 1/99 to 50/50.

13. A dispersion as set forth in claim 1, wherein the hydrocarbon organic solvent is an n-paraffin hydrocarbon solvent or an isoparaffin hydrocarbon solvent.

14. A process for the preparation of a dispersion of fine particles of modified polyethylene, which comprises adding an acid to an aqueous dispersion containing in the form of fine particles having an average dispersed particle size of 0.3 to 20 μm an ethylene polymer or ethylene polymer composition having an acid value of 0.3 to 75 mg-KOH/g as a whole and a crystallinity of at least 45% as determined by the X-ray diffractometry, in which at least a part of the carboxyl group corresponding to said acid value is neutralized with a basic substance, to agglomerate the fine particles, adding a hydrocarbon organic solvent to the agglomerate to transfer the fine particles into the solvent phase, and separating and removing the aqueous phase.

15. A preparation process according to claim 14, wherein at least 20% of the carboxyl group in the aqueous dispersion is neutralized with the basic substance.

16. A preparation process according to claim 14, wherein the acid is added to the aqueous dispersion so that the pH value of the aqueous phase is smaller than 6.

17. A preparation process according to claim 14, wherein the acid is added to the aqueous dispersion so that the pH value of the aqueous phase is 2 to 4.

18. A preparation process according to claim 14, wherein the acid is one forming a water-soluble salt by reaction with the basic substance.

19. A preparation process according to claim 14, wherein a surface active agent is added to the aqueous dispersion prior to the addition of the acid to the aqueous dispersion.

20. A preparation process according to claim 19, wherein the surface active agent is a nonionic surface active agent having an HLB value smaller than 12.

21. A preparation process according to claim 19, wherein the surface active agent is added in an amount of 0.1 to 10% by weight based on the ethylene polymer or ethylene polymer composition.

* * * * *